United States Patent
Korilis et al.

(10) Patent No.: US 6,335,744 B1
(45) Date of Patent: Jan. 1, 2002

(54) TECHNIQUE FOR CONDUCTING A GAME OVER A COMMUNICATION NETWORK

(75) Inventors: Ioannis A. Korilis, New York, NY (US); Yuval Shavitt, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/120,380

(22) Filed: Jul. 21, 1998

(51) Int. Cl.[7] .............................. G06F 3/00; G06F 17/00
(52) U.S. Cl. .......................................... 345/835; 463/42
(58) Field of Search ................................ 345/348, 326, 345/329, 333, 334, 335, 339, 349, 357, 962, 977, 700, 733, 742, 744, 764, 765, 835, 839; 463/1, 29, 30, 31, 36, 37, 40, 42; 705/10, 14; 709/203, 217

(56) References Cited

U.S. PATENT DOCUMENTS

| | | | | |
|---|---|---|---|---|
| 5,539,871 A | * | 7/1996 | Gibson | 707/501 |
| 5,823,879 A | * | 10/1998 | Goldberg et al. | 463/42 |
| 5,964,660 A | * | 10/1999 | James et al. | 463/1 |
| 5,966,121 A | * | 10/1999 | Hubbell et al. | 345/328 |
| 5,995,102 A | * | 11/1999 | Rosen et al. | 345/339 |
| 6,036,601 A | * | 3/2000 | Heckel | 463/42 |
| 6,065,057 A | * | 5/2000 | Rosen et al. | 709/229 |
| 6,100,871 A | * | 8/2000 | Min | 345/145 |
| 6,196,920 B1 | * | 3/2001 | Spaur et al. | 463/42 |

* cited by examiner

Primary Examiner—Crescelle N. dela Torre

(57) ABSTRACT

A game has been designed to lure computer users to websites established by companies participating in the game. The participating companies advertise their products and/or services on the websites. The object of the game is to locate and procure a specified icon hidden at each of the websites. In accordance with the invention, the specified icon may assume one of three states, e.g., green, red and yellow states in that order. The three states vary with time and cycle themselves. A user is able to procure and click on a located icon only when it is in a green state, manifest by its green color. A red state of the icon indicates that the green state has just ended, and a yellow state of the icon indicates that the green state is imminent. Thus, in the course of playing the game, a user is likely to revisit or linger at a website whose icon is in a red or yellow state. As a result, such a user spends time on the website and may learn about its advertised products and/or services, thereby helping realize the advertising purpose of the website.

43 Claims, 2 Drawing Sheets

TECHNIQUE FOR CONDUCTING A GAME OVER A COMMUNICATION NETWORK

FIELD OF THE INVENTION

The invention relates to design of a game which may be conducted over a communication network, e.g., the World Wide Web (WWW) or the "web."

BACKGROUND OF THE INVENTION

As is well known, the World Wide Web (WWW) or the "web" is a graphical subnetwork of the Internet. Through the WWW, users at computer terminals may utilize a browser, e.g., the INTERNET EXPLORER or NETSCAPE NAVIGATOR browser, installed therein to access different websites, which are identified by their uniform resource locators (URLs).

Companies often establish websites and use them as "virtual store fronts" to advertise, and furnish information about, the products and/or services provided by the companies. To attract users to visit the websites to learn about their products and/or services, thereby hopefully resulting in additional sales, the companies may incorporate such attractions as elaborate graphics, sweepstakes, etc. in the websites.

One such attraction in the form of a game has been designed to lure users to specified websites of various companies participating in the game. This prior art game involves hiding pieces of a puzzle in the specified websites. A user playing the game needs to visit each specified website to locate the piece hidden therein. After locating all the pieces, the user is able to solve the puzzle and thereby wins a prize.

SUMMARY OF THE INVENTION

We have recognized that the advertising scheme based on, for example, the prior art game described above is ineffective in that, in the course of playing the game, the visit paid by a user to each specified website is often brief as the user typically collects the hidden piece in a "hit and run" manner.

Although like the prior art game, the inventive game also requires a user to locate and procure an object, e.g., a specified icon, hidden in one or more places in a website, the object in the inventive game in accordance with the invention possesses a state which is time-variant, and an indicator is used to indicate the object's time-variant state. For example, the color of the object may function as such an indicator. In that case, the color of the object changes in response to the varying state thereof. Specifically, the object in green corresponding to a green state indicates that the object is "ripe" for procurement by a user. After a first period elapses, the green object changes to red corresponding to a red state, indicating that it is "unripe" for procurement and the user has just missed the green object. After a second period elapses, the red object changes to yellow corresponding to a yellow state, indicating that the object is "unripe" but will become green and "ripe" for procurement soon. This sequence of a green state, followed by red and yellow states repeats itself.

Thus, with the object having the above time-variant state in accordance with the invention, when a user playing the inventive game finds out that the object in a website is not ripe, depending on the current state of the object, the user may wait at the website to procure the ripe object later. The color of the object other than green provides the user with a clue as to when the object will become ripe because of the aforementioned repetitive state sequence. As a result, the user is more likely to wait if the current object state is yellow than red. A user who chooses to wait at the website for the object to become ripe most likely reads, during the wait, the information about the products and/or services advertised thereon, thereby effectively realizing the advertising purpose of the game.

DETAILED DESCRIPTION

Figure 1:
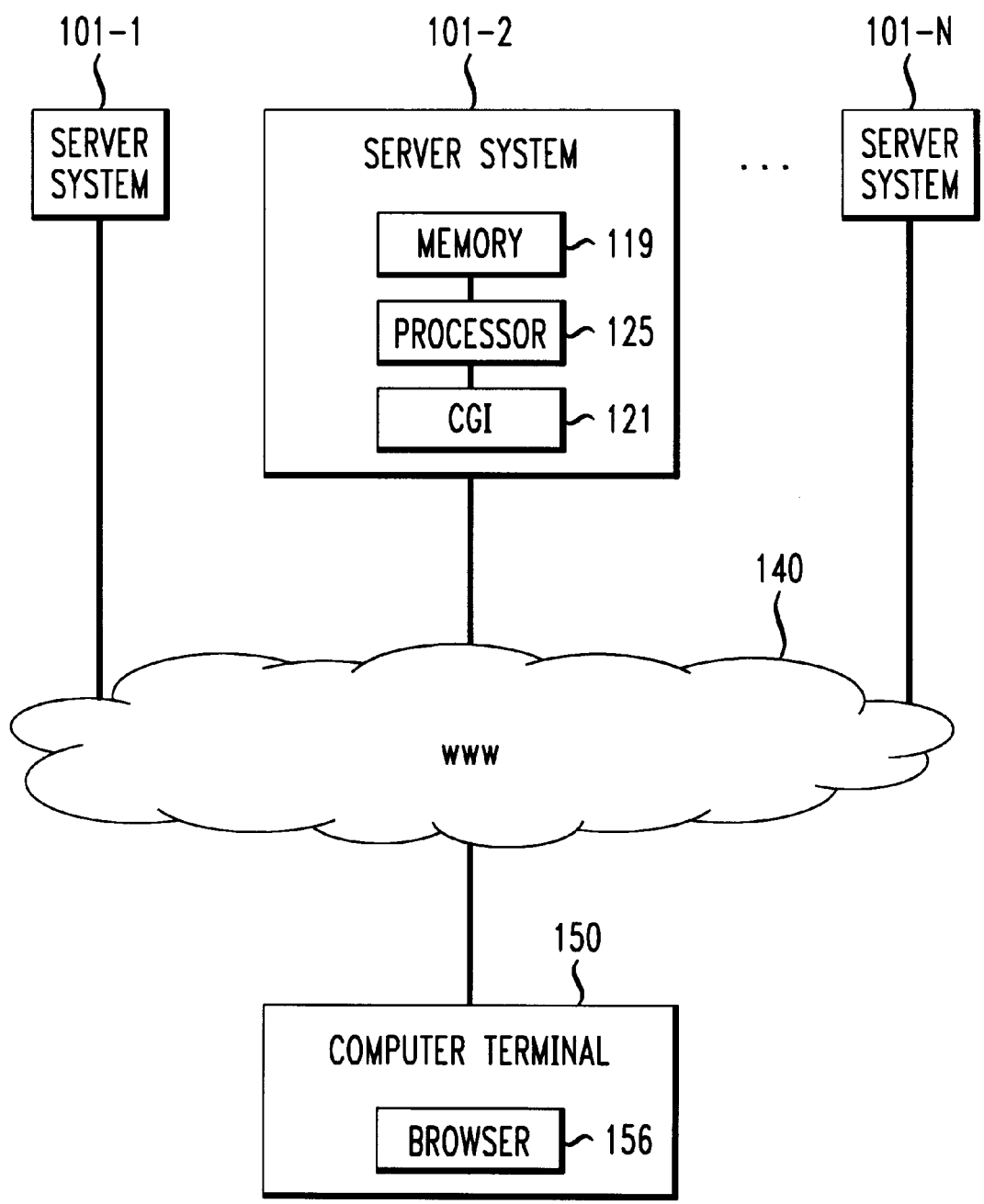
FIG. 1 illustrates a communications arrangement for conducting a game in accordance with the invention.

FIG. 1 illustrates a communications arrangement wherein server systems 101-1 through 101-N together conduct a game in accordance with the invention, where N is an integer greater than one. Systems 101-1 through 101-N each are connected to a communication network, e.g., World Wide Web (WWW) 140 which is a graphical subnetwork of the Internet. Without loss of generality, system 101-1 is administered by a company organizing the game, hereinafter referred to as the "hunt for green" game. Systems 101-2 through 101-N are administered by companies participating in the game.

The purpose of the "hunt for green" game is to lure computer users to visit the websites established by the participating companies in respective systems 101-2 through 101-N. These websites are identified by uniform resource locators (URLs) pre-assigned thereto. The participating companies most likely use the websites as "virtual store fronts" to advertise and furnish information about the products and/or services provided thereby. When the users visit the websites of the participating companies in the course of playing the game, the users then learn the product and/or service information from the websites. Based on such information, the users may decide to purchase the advertised products and/or services, thereby increasing the sales of the participating companies.

To achieve a similar advertising purpose, a prior art game which involves hiding pieces of a puzzle in specified websites has been developed. A user playing the prior art game needs to visit each specified website to locate the hidden piece therein. After locating all the pieces, the user is able to solve the puzzle and thereby wins a prize. We have recognized that the advertising scheme based on such a prior art game is ineffective in that, in the course of playing the game, the visit paid by a user to each specified website is often brief as the user typically collects the hidden piece in a "hit and run" manner.

Like the prior art game, the "hunt for green" game, described below, also requires a user to locate and procure an object, e.g., a specified icon, hidden in one or more places in a website. However, in accordance with the invention, the specified icon in the "hunt for green" game possesses a state which is time-variant, and an indicator is used to indicate the time-variant state of the icon. In this illustrative embodiment, the color of the icon functions as such an indicator. That is, the color of the icon changes in response to the varying state thereof. Specifically, a green icon corresponding to a green state indicates that the icon is "ripe" for procurement by the user-player. After a first period elapses, the green icon changes to red corresponding to a red state, indicating that it is "unripe" for procurement and the user has just missed the green icon. After a second period elapses, the red icon changes to yellow corresponding to a yellow state, indicating that the icon is "unripe" but will become green and "ripe" for procurement soon. This sequence of a green state, followed by red and yellow states repeats periodically.

Thus, with the icon having the above time-variant state in accordance with the invention, when a user finds out that the icon in a website is not green, depending on the current state of the icon, the user may wait at the website to procure the green icon later. The icon color other than green provides the user with a clue as to when the icon will become ripe because of the aforementioned repetitive state sequence. As a result, the user is most likely to wait if the current icon state is yellow than red. A user who chooses to wait at the website for the icon to become ripe most likely reads, during the wait, the information about the products and/or services advertised thereon, thereby effectively realizing the aforementioned advertising purpose of the game.

Figure 2:
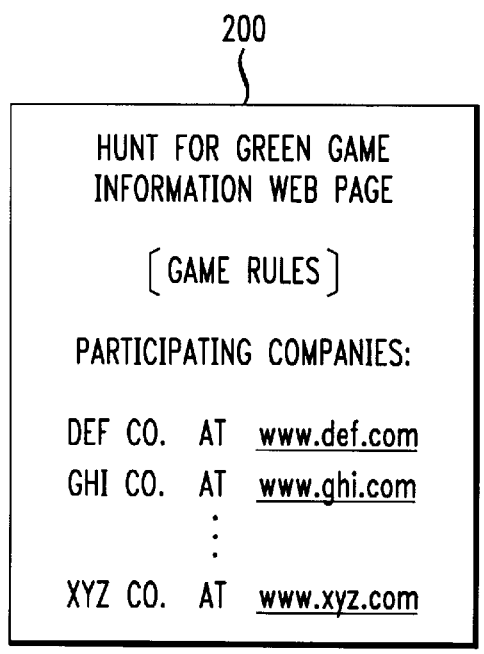
FIG. 2 illustrates a web page containing game information provided by a server system in the arrangement of FIG. 1.

To play the above "hunt for green" game, a user utilizes, e.g., computer terminal 150, which has conventional browser 156 installed therein, to access server system 101-1 at a predetermined URL. Accordingly, a connection between terminal 150 and system 101-1 is established through WWW 140. After the connection is established, system 101-1 transmits therethrough a web page containing game information, e.g., in the form of a hypertext markup language (HTML) document, to terminal 150 in accordance with the well known hypertext transfer protocol (HTTP). FIG. 2 illustrates such a web page, which is denoted 200. Using browser 156, terminal 150 opens web page 200 for the user to view the game information thereon. As shown in FIG. 2, the game information includes rules concerning the "hunt for green" game, and a list of the participating companies and their URLs in the form of hyperlinks.

Figure 3:
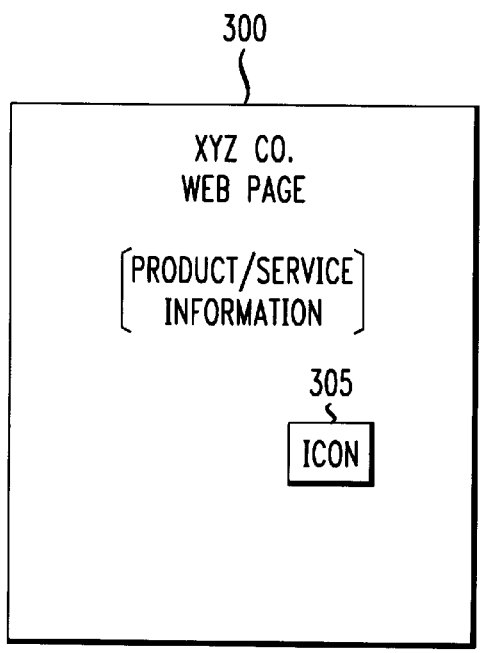
FIG. 3 illustrates a second web page containing an icon used in the game.

In this example, after learning the game rules on web page 200, the user utilizes an indicator device (not shown), e.g., a mouse device, connected to terminal 150 to point and click at one of the participating companies' URLs on page 200, say, of XYZ Co. Accordingly, terminal 150 is connected to a second server system, say, system 101-2, which corresponds to the selected URL. The website at the selected URL furnishes at least one web page containing information about the products and/or services provided by XYZ Co. for advertising purposes, along with a specified icon in compliance with the "hunt for green" game rules. FIG. 3 illustrates one such web page denoted 300, wherein the specified icon is denoted 305. The information included on web page 300 is stored in memory 119 in system 101-2.

System 101-2 maintains a game program in common gate interface (CGI) 121. Instructed by such a program, processor 125 generates, and controls the states of icon 305 in accordance with the invention. Specifically, processor 125 controllably causes icon 305 to periodically assume one of the aforementioned three states, i.e., the green, red and yellow states, in accordance with the invention.

Assuming that icon 305 in this instance is in a green state, i.e., icon 305 being in green and ripe for procurement, the user clicks on icon 305 according to the game rules. In response, server system 101-2 presents a registration page on terminal 150. The user may then fill it out at terminal 150 with information such as his/her name and address. By way of example, based on such registration information, server system 101-2 generates a game postcard, with an indication that the user has visited the XYZ Co. website. The postcard is then mailed to the user. Likewise, the user may obtain similar game postcards corresponding to other participating companies' websites. The user, especially a teenager, may simply want to collect such game postcards to impress his/her peers as to the number of websites which the user has visited. Such a reward system is particularly advantageous where users under a certain legal age are not allowed by law to play games, e.g., sweepstakes, involving a prize having a monetary value. In other words, because of the reward system used here which involves game postcards having no monetary value, everyone would be allowed to play the "hunt for green" game. In any event, where the law allows, a complete game postcard collection may be redeemable for a prize.

Continuing the above example, assuming that icon 305 is in a red or yellow state, clicking at icon 305 causes no response from server 101-2. The user may then want to revisit the XYZ Co. website to procure the green icon later especially when icon 305 is in a red state, indicating that the user has just missed the green icon. Otherwise, the user may want to wait at web page 300 especially when icon 305 is in a yellow state, indicating that the green state is imminent. While the user is waiting at web page 300, the aforementioned CGI game program causes the color of icon 305 to change over time. In this particular illustrative embodiment, the game program incorporates a conventional server push technique, whereby the connection between terminal 150 and system 101-2 remains open after the initial transfer of web page 300 to terminal 150, and system 101-2 periodically sends new data through that connection to terminal 150 to, e.g., update the state or color of icon 305. As is well known, such a server push technique is enabled by a multipart mixed-media type feature of multipurpose Internet mail extensions (MIME) for multimedia document transmission over the Internet.

The foregoing merely illustrates the principles of the invention. It will thus be appreciated that a person skilled in the art will be able to devise numerous arrangements which, although not explicitly shown or described herein, embody the principles of the invention and are thus within its spirit and scope.

For example, it will be appreciated that in implementing the inventive game, multiple icons similar to icon 305 may appear on a web page or in a website. The respective states of such icons may be dependent or independent, and the icons may not become ripe at the same time.

In addition, in the disclosed embodiment, the above CGI game program is maintained by an individual server system, e.g., system 101-2. It will be appreciated that a centralized system, e.g., system 101-1, may be used to maintain and manage all CGI game programs in the respective server systems, e.g., systems 101-2 through 101-N. In that case, the centralized system may orchestrate the whole "hunt for green" game, and control the states of the icons in the respective websites, thereby ensuring that the game complies with the stated game rules. In addition, the centralized system may provide to each server system options for selection as to the durations and frequencies of the states of the icon or icons appearing in its website.

Moreover, in the disclosed embodiment, the icon used in the "hunt for green" game has three states, namely, the green, red and yellow states. It will be appreciated that one may implement only two of the three states, or more than three states, instead, to realize the game.

Finally, for example, server system 101-2 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

We claim:

1. A system for conducting a game in which an object is to be procured, the system comprising:
 a processor for providing the object to be procured, the object being embedded on a web page and having a state which varies with time; and
 an indicator for indicating the state of the object, the state of the object being indicated to be a predetermined state when the object is ready for procurement.

2. The system of claim 1 wherein the object includes an icon.

3. The system of claim 1 wherein the indicator includes a color of the object.

4. The system of claim 3 wherein the color of the object changes in response to a change in the state of the object.

5. The system of claim 1 wherein the predetermined state recurs from time to time.

6. The system of claim 1 wherein the state of the object is indicated to be a second state after the predetermined state in accordance with a selected pattern.

7. The system of claim 1 wherein the web page contains advertising information.

8. A communications arrangement for conducting a game, the arrangement comprising:
 a processor for providing an object to be procured in the game, the object being embedded on a web page and assuming one of a plurality of states;
 a mechanism for determining which one of the states the object assumes as a function of time; and
 a controller for responding to a signal representative of a selection of the object when the object assumes a selected one of the states.

9. The arrangement of claim 8 further comprising a communication network, wherein the signal comes from the network.

10. The arrangement of claim 9 wherein the network includes a World Wide Web (WWW).

11. The arrangement of claim 8 wherein the web page contains information concerning an entity participating in the game.

12. The arrangement of claim 9 wherein the network includes at least part of an Internet.

13. The arrangement of claim 8 wherein the object is colored, each state being associated with a different color, the selected state assumed by the object being indicated by a selected color which the object is in, the selected color being associated with the selected state.

14. The arrangement of claim 8 further comprising a terminal for viewing the object.

15. The arrangement of claim 8 wherein the processor includes the controller.

16. A system for conducting a game, the system comprising:
 means for providing an object for procurement in the game, the object being embedded on a web page and having a viewable state which is variable;
 means for changing the state of the object from a predetermined viewable state to at least a second viewable state; and
 means for indicating that the object is in the predetermined viewable state when the object is ready for procurement;
 the states being configured such that there is an increased likelihood that a participant in the game will view the web page during a period of time in which the object to be procured is in the second viewable state.

17. The system of claim 16 wherein the web page is identified by a predetermined uniform resource locator (URL).

18. The system of claim 16 wherein the at least second state follows the predetermined state in accordance with a selected pattern.

19. The system of claim 16 wherein the predetermined state recurs from time to time.

20. The system of claim 16 further comprising means for controlling a frequency of the predetermined state.

21. The system of claim 16 further comprising means for controlling a duration of the predetermined state.

22. The system of claim 16 wherein the object is colored, the predetermined state being indicated by a predetermined color which the object is in.

23. A method for conducting a game in which an object is to be procured, the method comprising:
 providing the object to be procured, the object being embedded on a web page and having a state which varies with time; and
 indicating the state of the object, the state of the object being indicated to be a predetermined state when the object is ready for procurement.

24. The method of claim 23 wherein the object includes an icon.

25. The method of claim 23 wherein the indicator includes a color of the object.

26. The method of claim 25 wherein the color of the object changes in response to a change in the state of the object.

27. The method of claim 23 wherein the predetermined state recurs from time to time.

28. The method of claim 23 wherein the state of the object is indicated to be a second state after the predetermined state in accordance with a selected pattern.

29. The method of claim 23 wherein the web page contains advertising information.

30. The method of claim 23 further comprising obtaining information about a player of the game.

31. The method of claim 30 wherein the information includes an address of the player.

32. The method of claim 31 further comprising transmitting a message to the player using the address.

33. A method for conducting a game in which an object is to be procured, the object being embedded on a web page and having a state which varies with time, the method comprising the step of:
 indicating the state of the object, the state of the object being indicated to be a predetermined viewable state when the object is ready for procurement, and in at least a second viewable state when the object is not ready for procurement;
 the states being configured such that there is an increased likelihood that a participant in the game will view the web page during a period of time in which the object to be procured is not in the predetermined viewable state.

34. A method for conducting a game, the method comprising:
 providing an object for use in the game, the object being embedded on a web page and assuming one of a plurality of states;

determining which one of the states the object assumes as a function of time; and responding to a signal representative of a selection of the object when the object assumes a prescribed one of the states.

35. The method of claim 34 wherein the web page contains information concerning an entity participating in the game.

36. The method of claim 34 wherein the object is colored, each state being associated with a different color, the selected state assumed by the object being indicated by a selected color which the object is in, the selected color being associated with the selected state.

37. A method for conducting a game, the method comprising:

generating an object for procurement in the game, the object being embedded on a web page and having a state which is variable;

changing the state of the object from a predetermined state to at least a second state; and indicating that the object is in the predetermined state when the object is ready for procurement.

38. The method of claim 37 wherein the webpage is identified by a predetermined URL.

39. The method of claim 37 wherein the at least second state follows the predetermined state in accordance with a selected pattern.

40. The method of claim 37 wherein the predetermined state recurs from time to time.

41. The method of claim 37 further comprising controlling a frequency of the predetermined state.

42. The method of claim 37 further comprising controlling a duration of the predetermined state.

43. The method of claim 37 wherein the object is colored, the predetermined state being indicated by a predetermined color which the object is in.

\* \* \* \* \*